Figure 1:
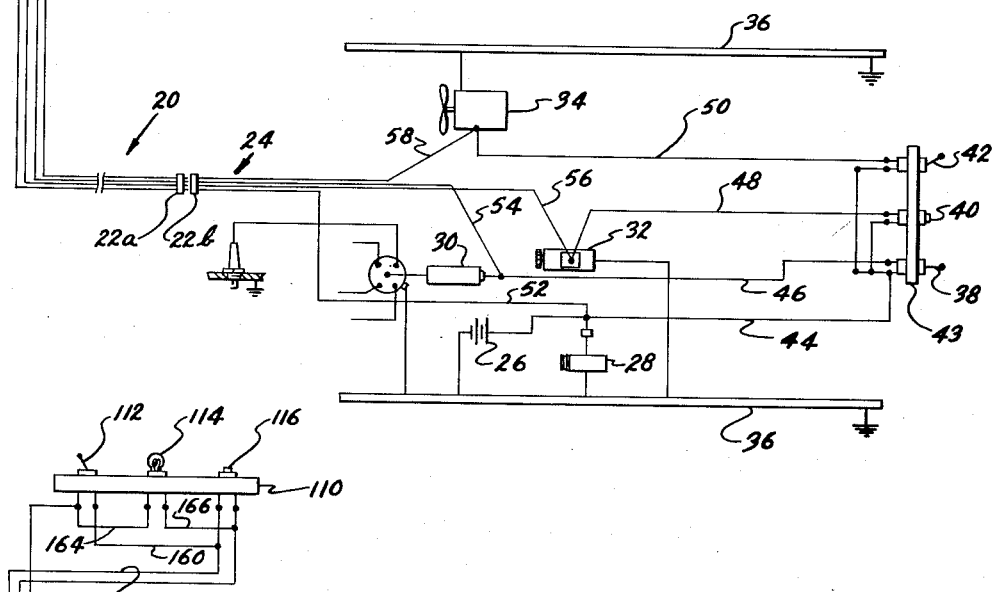

Nov. 6, 1962   R. P. CAPLETTE   3,063,044
REMOTE CONTROL MEANS FOR AUTOMOBILE ELECTRICAL SYSTEMS
Filed Feb. 27, 1959

INVENTOR
ROLAND P. CAPLETTE

BY *Chapin & Neal*

ATTORNEYS

United States Patent Office 3,063,044
Patented Nov. 6, 1962

3,063,044
REMOTE CONTROL MEANS FOR AUTOMOBILE ELECTRICAL SYSTEMS
Roland P. Caplette, 20 Mulberry St., West Springfield, Mass.
Filed Feb. 27, 1959, Ser. No. 796,007
3 Claims. (Cl. 340—226)

The present invention relates to improved means for remote control of automobile electrical systems.

The object of the invention is to improve and facilitate the starting of an automobile from a remote point and further is directed to the provision of means for controlling the heater unit of an automobile from a remote point so that the inconvenience and discomfort of going from a heated house to a cold car may be overcome.

The above and other related objects as well as the novel features of the invention will be apparent from reading of the following description of the disclosure found in the accompanying drawing and the particular novelty thereof pointed out in the appended claims.

Figure 2:
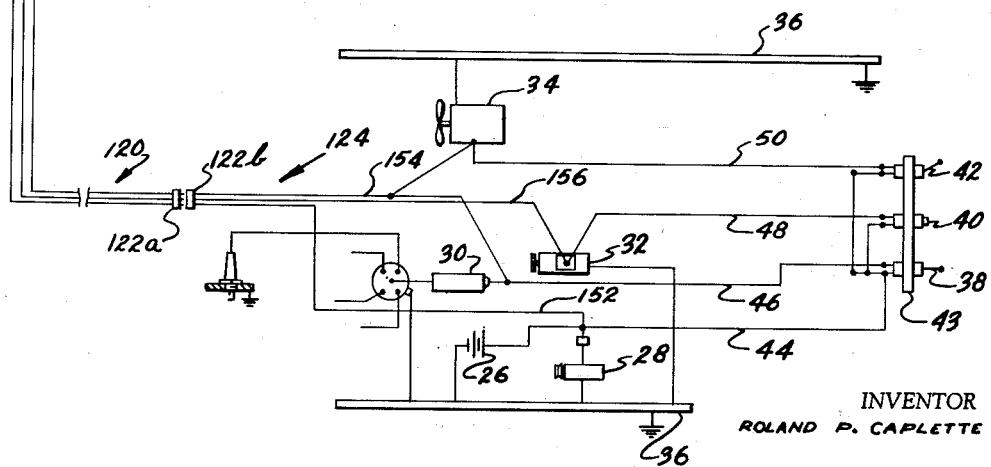

In the drawing:

FIG. 1 is a diagrammatical view of a preferred embodiment of the present invention; and FIG. 2 is a diagrammatical showing of an alternate embodiment of the present invention.

One of the primary purposes of the present invention is to enable a person to start the engine of his automobile, particularly in the early morning, from a control panel located inside his house, and further to enable him to actuate the heating unit of the automobile so that after a short period of time he is able to go from his house to a heated car, and is therefore not exposed to any prolonged period of cold temperature which is not only discomforting but could result in illness.

To this end there is provided, in the diagrammatical showing of FIG. 1, a control panel 10 which is mounted inside the house. Mounted on the control panel 10 are an ignition switch 12 and indicating light 14, a motor start switch 16 and a heater switch 18. Wires leading from the control panel 10 are secured together and form a cable 20 which terminates in one member 22a of a contact unit. The second member 22b of the contact unit receives a second cable 24 comprising wires which extend to the electrical system of the automobile. The wires of cables 20 and 24 thus may be electrically joined by the contact unit members 22a and 22b when it is desired to utilize the control switches on the remote panel 10 and the two cables may thereby be separated when it is desired to drive the automobile away in normal use, the contact member 22b of course stays with the automobile.

Referring now to the pertinent electrical components of the automobile which are illustrated, it will be noted that they comprise a battery 26, a generator 28, a spark coil 30, a starter motor 32 and heater fan motor 34, with each of these elements being appropriately connected to the frame members 36 which provide a ground return. The present invention requires no modification of the conventional circuits and controls for these electrical components of the automobile. There is illustrated a typical such circuit and controls which will be briefly described. An ignition switch 38, a motor start switch 40 and a heater switch 42 are mounted on the dashboard 43 of the automobile. A "hot" wire 44, extends from the battery 26 and generator 28 to the one side of each of the switches 38, 40 and 42. When the ignition switch 38 is closed a circuit is completed through line 46, to energize the spark coil 30, thereafter the start switch 40 may be closed to energize the coil of the start motor 32 through wire 48. Likewise, the heater motor 34 may be actuated by closing switch 42 and completing a circuit through the heater motor coil by way of line 50.

The remotely disposed switches on panel 10 are connected in effective parallel relationship with the existing automobile circuit in a manner which enables remote actuation of the named electrical components. Thus it will be seen that one wire 52 of the cable 24 is the hot wire and is connected to the positive or high voltage side of both the battery 26 and generator 28. A second wire 54 is connected to the top of the ignition coil 30, a third wire 56 is connected to the starter motor 32 and the fourth wire 58 is connected to the heater motor 34. The wires 52, 54, 56 and 58 are electrically joined to corresponding wires 52', 54', 56' and 58' of cable 20 by connecting the contact units 22a and 22b. The hot wire 52' extends directly to one side of the start switch 16 and is also connected by a wire 60 to one side of the ignition switch 12 and further is connected by wire 62 to one side of the heater switch 18. Wire 54'—54 provides an electrical connection between the other side of the ignition switch 12 and the ignition coil 30. The other side of the ignition switch 12 is also connected by a wire 64 to one side of the signal light 14. Wire 56' from the starter motor 32 is connected to the other side of the start switch 16 and also is connected by wire 66 to the other side of the signal light 14. The fourth wire 58' of cable 20 is connected to the other side of heater switch 18.

With this described arrangement the operation of the remote control means is as follows:

Normally with the automobile parked outside the house, in a garage or carport, the switches 38, 40 and 42 in the automobile will be open. The cables 22 and 24 will be joined by the contact units 22a and 22b. When it is desired to start the automobile the switch 12 will be closed completing a circuit through wires 52, 52', 60 and 54', and 54, thereby energizing coil 30. Also, when the ignition switch 12 is closed, the indicating light 14 will be illuminated by reason of a circuit being completed from the hot wire 52' through switch 12, wires 64, 66, 56' and 56 back through the starter coil of the starter motor 32 to ground. With this arrangement there will be at all times a warning at the remote location that the ignition is turned on and that current is being discharged from the battery 26. It will also be noted that the size or resistance value of the signal light 14 is critical in that it must be relatively high compared to the resistance of the coil of starter motor 32. Thus, it will be noted that with switch 12 closed, the hot wire 52' is connected through the light 14 to complete a circuit through the coil of the starter motor 32, and if sufficient current were to flow through the coil of motor 32 it would be actuated and attempt to start the motor immediately upon closure of said switch 12. By using a signal light 14 which has a relatively high resistance, only a small amount of current is drained through the coil of motor 32 back to ground without inducing a starting torque on the motor 32.

With the ignition coil 30 energized, it is then possible to start the automobile motor by momentarily closing switch 16 which connects the hot wire 52' directly with the wire 56' thereby placing the full voltage of the battery 26 across the coil of the starter motor 32 to actuate the motor 32 and start the engine of the automobile. When the switch 16 is closed the signal light 14 is effectively by-passed and will likely cease to glow. Upon release of the start switch 16 the signal light 14 will again be illuminated as it is no longer by-passed or short circuited. If the motor is successfully started such condition will be reflected by an increase in the brilliancy of the light 14 since, usually at least, with the motor operating and the generator 28 charging, there will be a greater current provided with a resultant increase in the brilliancy of the signal light 14. Preferably after it has been thus ascertained that the motor has started, the switch 18 is closed to complete a circuit from the hot wire 52' through wires 62, 58' and 58 to energize the heater motor 34. As the automobile engine idles and warms up, the heater fan will function to circulate warm air into the automobile. After a relatively short period of time both the engine and the interior of the car will be warmed up. The cable 20 may then be disconnected from the cable 24 and the automobile driven away in comfort.

One of the advantages of the above-described arrangement is that the remote controls may be provided as a separate accessory unit for most any type of automobile. That is, the remote control panel 10 and the cable 20 leading therefrom may be provided as a unit requiring simple installation of the control panel at whatever point desired, as for example in a home kitchen. Further, the cable 24 may be similarly provided with clips which permit ready attachment of the wires 52, 54, 56 and 58 to the described points in the conventional electrical system of the automobile. The contact unit 22b, of course, can be mounted either interiorally or exteriorly of the automobile hood whichever is most convenient for the user. In any event, in the usual case, there is no need for rearrangement of the existing wiring of the automobile.

Referring now to FIG. 2, an alternate embodiment is seen which, in some respects, is simpler than that which was above described. In this embodiment, the electrical components of the automobile and the conventional circuit and switch controls therefor are the same as in FIG. 1, and are designated by the same reference characters, with no detailed description being given.

The basic principles of construction and operation of the remote control means shown in FIG. 2 are essentially the same as in FIG. 1 in that a control panel 110 is provided for mounting at a remote location and has mounted thereon an ignition switch 112 and indicator light 114 and a motor start switch 116. The wires leading from the control panel 110 are secured together and form a cable 120 which terminates in one member 122a of a contact unit, the second member 122b of the contact unit receives a second cable 124 comprising wires which extend to the electrical components of the automobile. The wires of cable 120 and 124 may thus be electrically joined or disconnected by the contact unit members 122a and 122b.

Again the remotely disposed switches on the remote panel 110 are connected in effective parallel relationship with the existing automobile electrical control circuit in a manner which enables remote actuation of the electrical components. Thus, it will be seen that one wire or the "hot" wire 152 of the cable 124 is connected to the positive or high voltage side of both the battery and generator 28. A second wire 154 is connected to the top of the ignition coil 30 and also to the heater fan motor 34 and a third wire 156 is connected to the starter motor 32. The wires 152, 154 and 156 are electrically connected to corresponding wires 152', 154' and 156' of cable 120. The hot wire 152' extends directly to one side of the start switch 116 and is also connected by a wire 160 to one side of the ignition switch 112. Wire 154' provides an electrical connection between the other side of the ignition switch 112 and both the ignition coil 30 and the heater fan motor 34. The other side of the ignition switch is also connected by a wire 164 to one side of the signal light 114. Wire 156—156' from the starter motor 32 is connected to the other side of the start switch 116 and also is connected by wire 166 to the other side of the signal light 114. With this described arrangement remote control of the automobile electrical system may be had as follows:

Ignition switch 112 is turned on completing a circuit through wires 152, 152', 160, 154' and 154, thereby energizing the ignition coil 30 and also actuating heater fan motor 34. Also when the ignition switch 112 is closed the indicating light 114 will be illuminated by reason of a circuit being completed from the hot wire 152' through switch 112, wires 164, 166, 156' and 156, back through the starter coil of the starter motor 32 to ground. The criticality of the resistance of signal light 114 is the same as that for the signal light 14 described in connection with FIG. 1. With ignition switch on, the starter switch 116 may be momentarily closed connecting the hot wire 152' directly with the wire 156', thereby placing the full voltage of the battery 26 across the starter motor 32 to actuate the motor 32 and start the engine of the automobile.

Since the heater fan motor is actuated when the ignition switch 112 is closed, hot air will be circulated in the automobile as soon as the engine warms up. Thus the present embodiment has the advantage of greater economy in using a fewer number of wires in the cables 120 and 124 and a fewer number of switches with the same overall end results of providing remote means for controlling both the starting of the automobile and actuating the heater fan motor so that the interior of the automobile will be warmed up and comfortable after a short period of time.

It will, of course, be apparent that solenoids or relays could be employed to actuate or control the motors herein described, in which case the wires from the remote panel would be connected to such solenoids instead of directly to the motors.

Having thus described the invention, what is claimed is novel and desired to be secured by Letters Patent of the United States is:

1. Remote control means for an automobile electrical system comprising a battery and a generator connected in parallel, an ignition coil, a starter motor and a heater fan motor, with the frame of the automobile serving as ground for each of the named elements, said remote control means comprising a remote control panel on which are mounted an ignition switch, an indicating light, a motor start switch, and a heater switch, a four wire cable leading from said remote panel to the automobile, a separable contact unit interposed in said cable with one portion thereof adapted to stay with the automobile when the contact unit is separated, one wire of said cable being connected to said battery and said generator, said one wire being the hot wire, another wire being connected to said ignition coil, a third wire being connected to said starter motor, and a fourth wire being connected to said heater fan motor, said hot wire being also connected to one side of the motor start switch and one side of said ignition switch and one side of said heater switch, said other wire being connected to the other side of said ignition switch, and the other side of said ignition switch also being connected to one side of said indicating light, and said third wire being connected to the other side of said starter switch and also to the other side of the said indicating light, and said fourth wire being connected to the other side of said heater switch and wherein means are provided for preventing sufficient current from flowing from said hot wire through said ignition switch and indicating light back to said third wire to energize the starter motor when the ignition switch is closed, whereby the ignition coil may be remotely energized, with the indicating light reflecting such condition, the starter motor may be remotely actuated to start the automobile engine and an increase in brilliancy of the indicating light will show that the motor has started and the engine is in operation and whereby the heater fan motor may also be remotely and independently actuated.

2. Remote control means for an automobile electrical system comprising a battery and a generator connected in parallel, an ignition coil, a starter motor and a heater fan motor, with the frame of the automobile serving as ground for each of the named elements, said remote control means comprising a remote control panel on which are mounted an ignition switch, an indicating light, a motor start switch, and a heater switch, a four wire cable leading from said remote panel to the automobile, a separable contact unit interposed in said cable with one portion thereof adapted to stay with the automobile when the contact unit is separated, one wire of said cable being connected to said battery and said generator, said one wire being the hot wire, another wire being connected to said ignition coil, a third wire being connected to said starter motor, and a fourth wire being connected to said heater fan motor, said hot wire being also connected to one side of the motor start switch and one side of said ignition switch, and one side of said heater switch, said other wire being connected to the other side of said ignition switch, and the other side of said ignition switch also being connected to one side of said indicating light, said third wire being connected to the other side of said starter switch and also to the other side of the said indicating light, and said fourth wire being connected to the other side of said heater switch and wherein the indicating light has a relatively high resistance sufficient to prevent sufficient current flow from flowing from said hot wire through said ignition switch and indicating light, back to said third wire to energize the starter motor when ignition switch is closed, whereby the ignition coil may be remotely energized, with the indicating light reflecting such condition, the starter motor may be remotely actuated to start the automobile engine and an increase in brilliancy of the indicating light will show that the motor has started and the engine is in operation and whereby the heater fan motor may also be remotely and independently actuated.

3. Remote control means for an automobile electrical system comprising a battery and generator connected in parallel, an ignition coil, a starter motor and a heater fan motor, with the frame of the automobile serving as ground for each of these named elements, said remote control means comprising a remote control panel on which are mounted an ignition switch, an indicating light and a motor start switch, a three-wire cable leading from said remote panel to the automobile, a separable contact unit interposed in said cable with one portion thereof adapted to stay with the automobile when the contact unit is separated, one wire of said cable being connected to said battery and said generator, said one wire being the hot wire, another wire being connected to said ignition coil and said heater fan motor, and a third wire being connected to said starter motor, said hot wire also being connected to one side of the motor start switch and one side of said ignition switch, said other wire being connected to the other side of said ignition switch and the other side of said ignition switch also being connected to one side of said indicating light, said third wire being connected to the other side of said start switch and also to the other side of said indicating light, and wherein means are provided for preventing sufficient current from flowing from said hot wire through said ignition switch and indicating light back to said third wire to energize the starter motor when the ignition switch is closed, whereby the ignition coil and heater fan motor may be remotely energized and actuated by closing the ignition switch, with the indicating light reflecting such condition, and the starter motor may be remotely actuated to start the automobile engine and an increase in brilliancy of the indicating light will show that the motor has started and the engine is in operation.

References Cited in the file of this patent
UNITED STATES PATENTS

| | | |
|---|---|---|
| 1,479,808 | Hayward | Jan. 8, 1924 |
| 2,423,464 | Moncrief | July 8, 1947 |
| 2,544,955 | Harrelson | Mar. 13, 1951 |
| 2,591,618 | Schaeffer | Apr. 1, 1952 |
| 2,606,298 | Merritt | Aug. 5, 1952 |
| 2,739,247 | Pope | Mar. 20, 1956 |
| 2,873,382 | Herring | Feb. 10, 1959 |